March 4, 1969
D. A. MILLER
3,430,709
MOTION TRANSMISSION MECHANISM FOR IMPACT TOOLS
Filed Oct. 2, 1967
Sheet 1 of 3
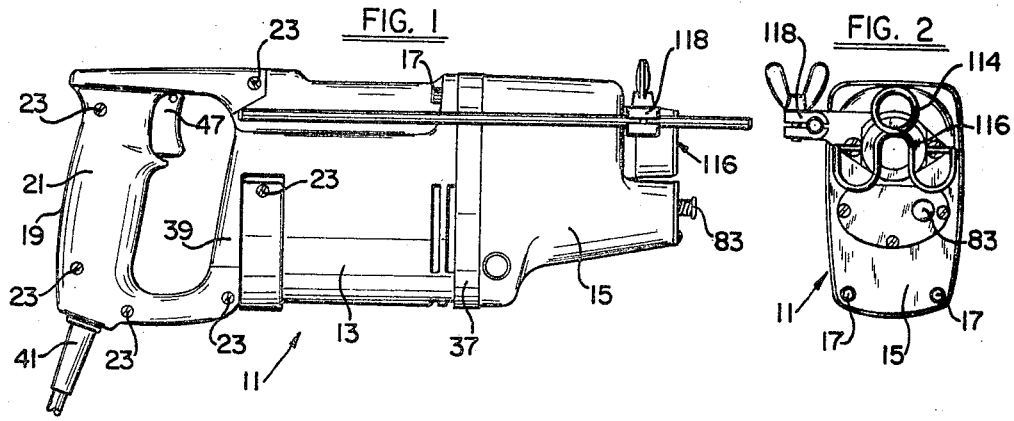
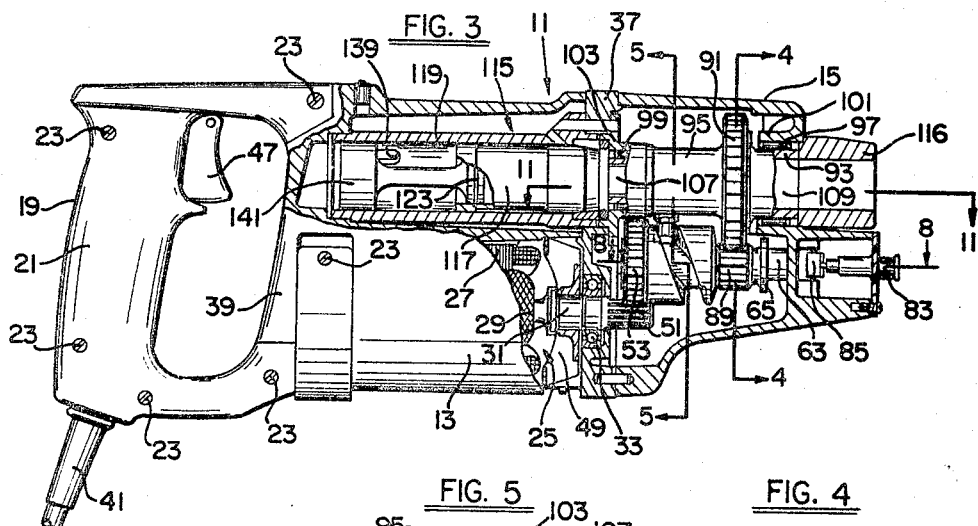
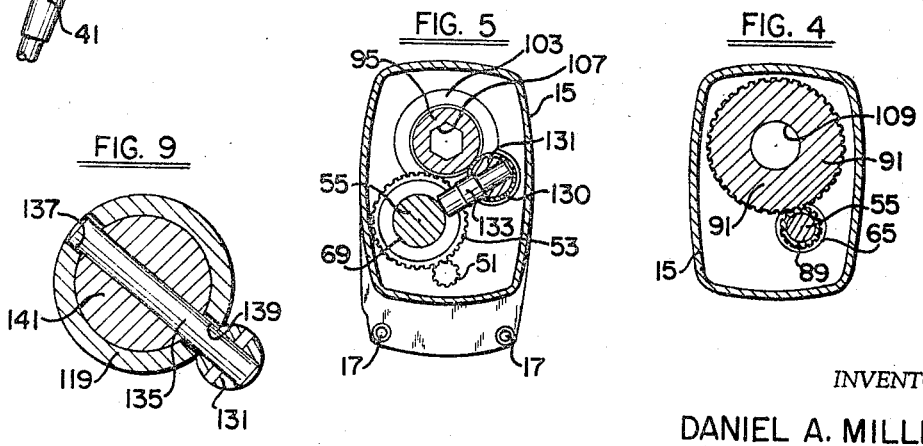
INVENTOR
DANIEL A. MILLER
BY Joseph R. Slotwik
ATTORNEY

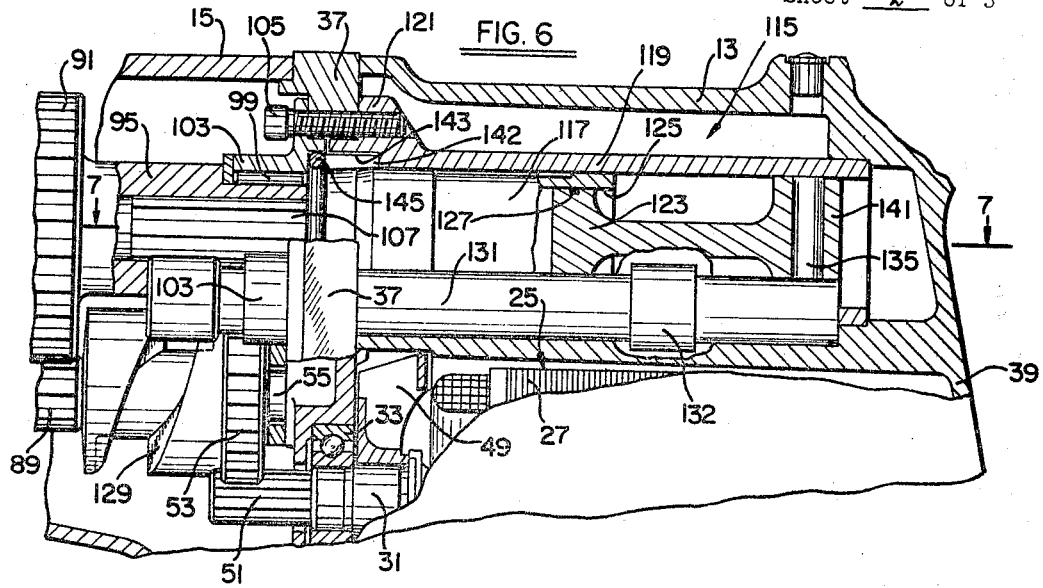
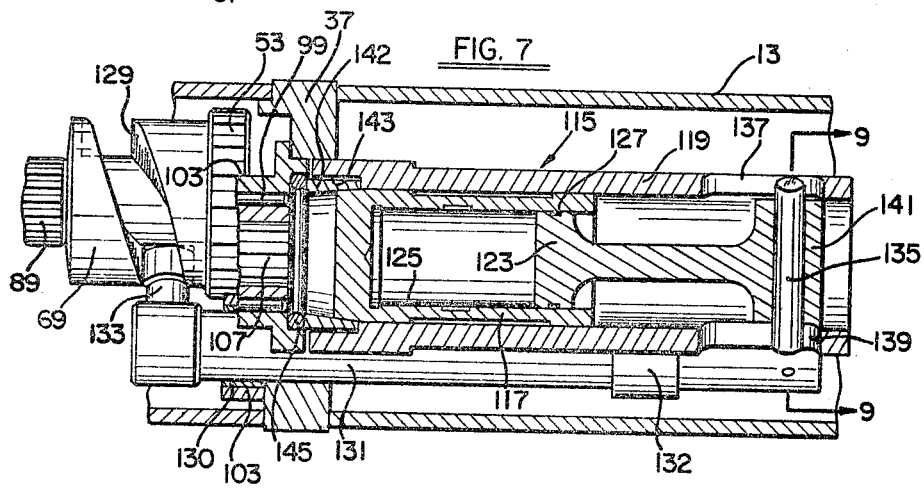
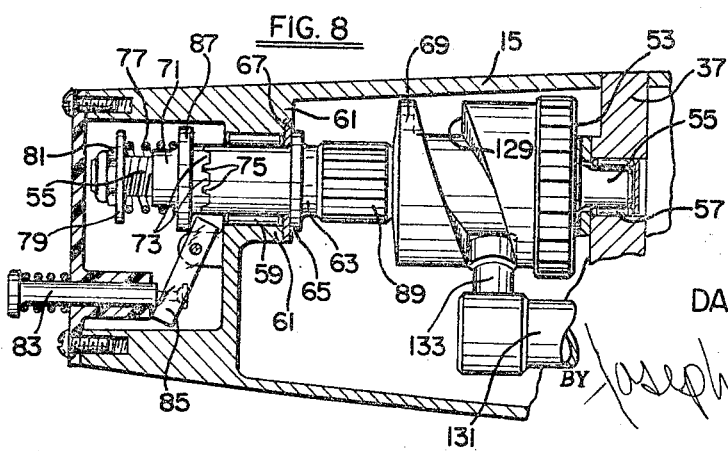

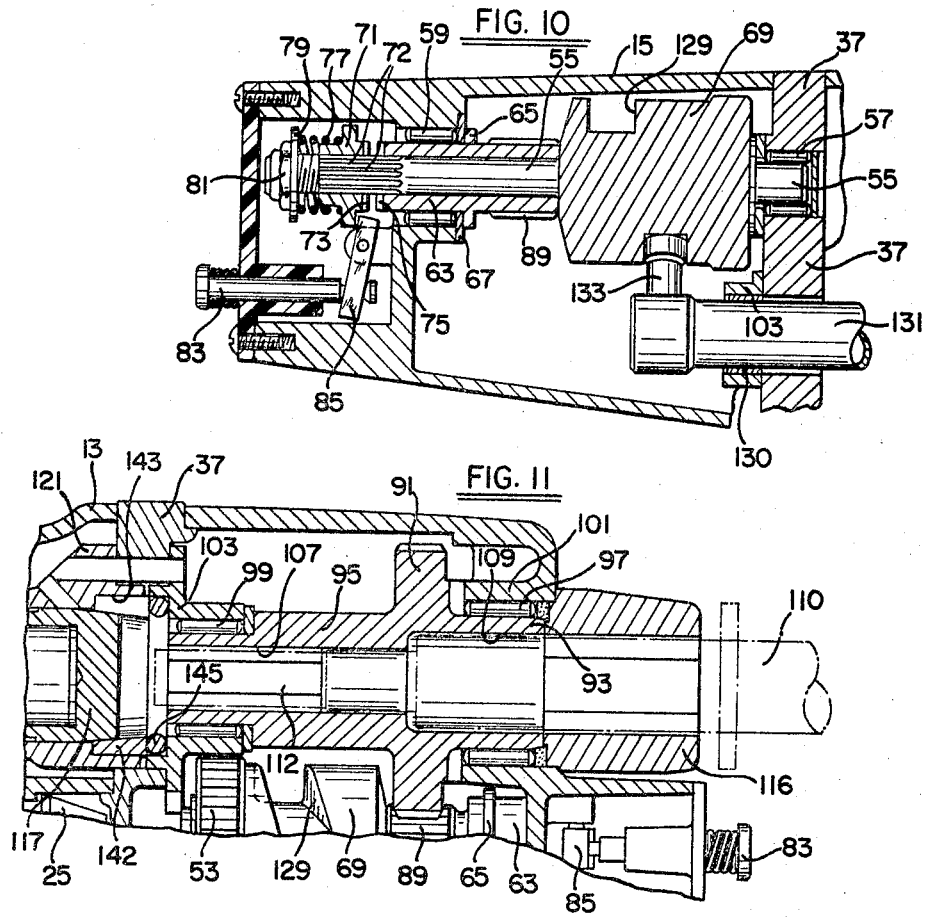

United States Patent Office 3,430,709
Patented Mar. 4, 1969

3,430,709
MOTION TRANSMISSION MECHANISM FOR
IMPACT TOOLS
Daniel A. Miller, Glen Arm, Md., assignor to The Black
and Decker Manufacturing Company, Towson, Md., a
corporation of Maryland
Filed Oct. 2, 1967, Ser. No. 672,274
U.S. Cl. 173—123                          11 Claims
Int. Cl. E21c 3/00; B25d 11/02, 11/10

ABSTRACT OF THE DISCLOSURE

The device hereinafter disclosed is a powered, hand-held tool which includes a housing having a drive motor supported therein. A tool bit socket is rotatably supported by the housing and is adapted to be selectively rotated by the motor through a rotary transmission. The motor also is connected through a motion transmission mechanism to an impact or percussive mechanism which is adapted to strike a tool bit carried by the socket so that in addition to being selectively rotated, the tool bit is hammered into engagement with a workpiece during motor operation.

Brief summary of the invention

The present invention relates to an improved motion transmission mechanism adapted to convert rotary motion to reciprocation in an impact or hammer tool, which transmission mechanism includes a power-driven rotary cam adapted to reciprocate an elongated member along an axis parallel to the cam rotational axis. The elongated member in turn is connected to an impact mechanism to reciprocate the latter along an axis parallel to both previously mentioned axes. A tool bit is supported for longitudinal movement and is adapted to be struck by the impact mechanism so that during cam rotation, the tool bit can be hammered into engagement with a work surface. This construction importantly minimizes the overall axial length of the tool which in turn makes the tool easier to handle and less expensive to make. In addition, the cam and cam follower are positively engaged through all phases of movement to provide better tool control with a minimum of parts. Furthermore, the tool construction of this invention readily lends itself to use in a rotary-hammer type tool wherein it is desirable to selectively rotate the tool bit to enhance tool performance or to carry out other operations.

Main objects, therefore, of the present invention are to provide an improved motion transmission mechanism for converting rotary to reciprocating motion in a power operated hammer tool and the like, which transmission mechanism minimizes the overall, axial, tool dimension and employs a minimum of parts to thereby provide a relatively lightweight, compact tool capable of easy handling.

Additional important objects of the present invention are to provide an improved motion transmission mechanism of the above character which is positively acting in all phases of operation and which is particularly adapted for use in rotary hammer tools wherein a tool bit is subjected to rotation and/or impacting.

Further objects of the present invention include the provisions of an improved motion transmission mechanism of the above character which is relatively inexpensive to manufacture, rugged in construction and reliable in use.

Other objects and advantages of the present invention will become more apparent from a consideration of the detailed description and claims to follow taken in conjunction with the drawings appended hereto.

Brief description of the drawings

FIG. 1 is a side elevational view illustrating a rotary hammer embodying the present invention;

FIG. 2 is an end view of the tool of FIG. 1;

FIG. 3 is an enlarged view, similar to FIG. 1, partly in section and with some parts broken away to illustrate the present invention;

FIG. 4 is a sectional view of FIG. 3 taken along the line 4—4 thereof;

FIG. 5 is a sectional view of FIG. 3 taken along the line 5—5 thereof;

FIG. 6 is an enlarged, fragmentary, vertical sectional view illustrating the motion transmission mechanism of the present invention;

FIG. 7 is a sectional view of FIG. 6 taken along the line 7—7 thereof;

FIG. 8 is an enlarged sectional view of FIG. 3 taken along the line 8—8 thereof;

FIG. 9 is a sectional view of FIG. 7 taken along the line 9—9 thereof;

FIG. 10 is a view, similar to FIG. 8, but showing the clutch disengaged and the cam in section 1; and FIG. 11 is an enlarged fragmentary sectional view of FIG. 3 taken along the line 11—11 thereof.

Broad statement of the invention

Broadly described, the present invention relates to a power-driven tool of the type having a housing, a drive motor within said housing and having a rotatable shaft, a tool bit supporting member in said housing and adapted to support a tool bit for reciprocating movement along a first longitudinal axis, a reciprocable impact mechanism adapted to strike said tool bit and impart an impact blow thereto, a motion transmission mechanism interconnecting said shaft and said impact mechanism, and includes that improvement wherein said motion transmission mechanism comprises cam means driven by said motor and rotatable about a second axis parallel to said first axis, cam follower means engageable with said cam means and supported for movement along a third longitudinal axis parallel to said first and second axes, said cam follower means being interconnected with said impact mechanism whereby to impart an impact blow to said tool bit.

In another aspect, the present invention includes a power-driven tool comprising an elongated housing, a drive motor including motor shaft means longitudinally supported within said housing, cam shaft means driven by and extending parallel to said motor shaft means, a tool bit supporting member adapted to support a tool bit for reciprocating movement along an axis parallel to said cam shaft and motor shaft means and disposed to the radial side of said cam shaft means remote from said motor shaft means, a reciprocable impact mechanism generally axially aligned with said tool bit supporting member and spaced axially from said cam shaft means, means interconnecting said cam shaft means and said impact mechanism including an elongated member extending parallel to said cam shaft and motor shaft means and movable longitudinally in response to rotation of said cam shaft means, whereby to reciprocate said impact mechanism and impart an impact blow to said tool bit.

Detailed description

Referring now more specifically to the drawings, a hand-held, portable, electric power tool embodying the present invention is illustrated generally at 11 in FIG. 1 and is seen to include a tool housing comprising a motor housing 13 and an end housing 15 secured together by screws 17. The motor housing 13 has an end handle 19 at its end remote from the end housing 15 and a handle cover 21 is secured in clam shell fashion to the handle 19 by screws 23. The motor housing 13, the end housing 15, together with the end handle 19 and cover 21 may be constructed of cast aluminum or magnesium or other suitable metal, or, if the tool 11 is to be of the "all insulated" type, these parts may be constructed from an insulating, non-metallic material such as those classed as thermoplastic and thermosetting materials, reinforced or otherwise.

A universal electric motor 25 (FIGS. 3 and 6) is disposed within the motor housing 13 and is seen to include a stationary field 27 and a rotating armature 29, the latter of which includes an armature shaft 31 journaled fore and aft by bearings 33 (only one of which is shown). A motor housing cover 37, secured between the motor housing 13 and the end housing 15 by the screws 17, carries one of the bearings 33 while the other bearing (not shown) is seated in an end wall 39 of the motor housing 13. The motor 25 is energized from a suitable electric source through a line cord 41 trapped between the handle 19 and handle cover 21, and through electrical brushes (not shown) engageable with a commutator (not shown) fixed to the armature shaft 31 and which forms a part of the armature 29. An on-off trigger switch 47 is conveniently positioned at the end handle 19 and controls the flow of electrical current through the brushes to the motor armature 29 in the usual manner. A motor cooling fan 49 is pressed on or otherwise fixed to the armature shaft 31 to rotate therewith and moves cooling air past the motor 25 during tool operation as is customary.

The armature shaft 31 extends forwardly past the bearing 33 and into the end housing 15 and is formed with gear teeth 51 or, alternatively, may have a pinion suitably fixed thereto. The teeth 51 (or pinion) drivingly engage and rotate an intermediate gear 53 formed integral with or otherwise suitably secured to a cam shaft 55 (see FIGS. 6, 8 and 10). A bearing 57 carried by the motor housing cover 37 supports the cam shaft 55 at its rearward end while another bearing 59 seated in a boss 61 formed in the end housing 15 rotatably supports an elongated sleeve 63 through which the cam shaft 55 rotatably extends (FIGS. 8 and 10). The sleeve 63 is provided with a radially outwardly extending flange 65 spaced from the bearing 59 by a washer 67 and the inner end of the sleeve 63 terminates adjacent a generally cylindrical cam 69 formed integral with or otherwise suitably secured to the gear 53 which, in turn, is integral with or is otherwise suitably secured to the cam shaft 55. Thus, the gear 53 and cam 69 rotate with the shaft 55 while the sleeve 63, which is restrained against axial movement relative to the cam shaft 55, can rotate thereon.

The sleeve 63 is adapted for selective, conjoint rotation with the cam shaft 55 by means of a manually operable and torque releasable clutch sleeve 71. As shown in FIG. 8, the clutch sleeve 71 is disposed on the cam shaft 55 and is connected thereto, as by splines 72, so as to rotate conjointly therewith. The clutch sleeve 71 and the sleeve 63 are provided with confronting clutch teeth 73, 75, respectively, which, when engaged, cause the sleeve 63 to rotate conjointly with the cam shaft 55. The clutch sleeve 71 is normally biased axially toward the sleeve 63 by a compression spring 77 caged between a washer 79 and a flange 87 on the sleeve 71 and the biasing force of the spring 77 is adjustable by means of an adjusting nut 81 threaded on the cam shaft 55 outboard of the washer 79. The clutch sleeve 71 is retractable away from engagement with the sleeve 63 by means of an interconnected push button 83 and pivotal release lever 85, the latter of which engages behind the flange 87 on the clutch sleeve 71. Thus, by depressing the push button 83, the clutch teeth 73, 75 are disengaged and rotation of the sleeve 63 will stop. For a more detailed explanation of this clutch construction, reference may be made to applicant's copending application Ser. No. 672,289, filed Oct. 2, 1967, and owned by the assignee of the present application. However, since this construction forms no part of the present invention, it is not described further here.

The sleeve 63 has gear teeth formed thereon, or, alternately, has a pinion 89 suitably fixed thereto, to drivingly engage a spindle gear 91 (see FIGS. 3, 6 and 11). As shown there, the spindle gear 91 is integral with a spindle shaft formed by forwardly and rearwardly extending, tubular neck portions 93, 95 which are rotatably supported by bearing 97, 99 carried by a boss 101 on the end housing 15 and by a flanged bushing 103, respectively, the latter being fixed to the motor housing cover 37 by screws 105. The rearward tubular neck 95 has a socket 107 of irregular cross section which communicates with a bore 109 in the forward tubular neck portion 93. A tool bit 110 is positionable in the bore 109 and has a reduced shank 112 of hexagonal cross section adapted to slidably extend through the socket 107 and be driven thereby. Thus, the tool bit 110 will rotate conjointly with the spindle gear 91 but can slide longitudinally relative thereto. A releasable tool bit retainer 114 is provided on a nose piece 116 fixed upon the end housing 15 to prevent the tool bit 110 from pulling out of the bore 109. Also, an adjustable depth gauge 118 may be provided to limit the depth to which the tool bit 110 penetrates a work surface.

The shank 112 of the tool bit 110 when in position extends rearwardly beyond the tubular neck portion 95 and is adapted to be struck by a reciprocating impact mechanism 115 causing the tool bit to be hammered into engagement with a work surface. The impact mechanism 115, as shown in FIGS. 3, 6, 7 and 11, includes a floating ram 117 slidably disposed within a cylinder sleeve 119 which is provided with a radially outwardly extending mounting flange 121 secured to the motor housing cover 37 by the screws 105. A relatively short, disc shaped piston 123 is disposed within a cylindrical blind bore 125 formed in the floating ram 117 and the piston 123 carries a piston ring 127 which cooperates with the wall of the bore 125. In use, the piston 123 reciprocates longitudinally within the bore 125 and cooperation between the piston ring 127 and the wall of the bore 125 forms an air-spring providing alternate compression and rarefication so that the ram 117 is moved forwardly or toward the left, as seen in FIGS. 6 and 7, during forward or left-hand piston movement, and rearwardly or toward the right as the piston 123 moves rearwardly. Preferably, venting means is provided for the air trapped in the bore 125 so that this air can adjust itself to a substantially constant working level as the piston 123 reciprocates. One form of venting means found to perform highly satisfactorily is disclosed in detail in the U.S. patent to Akerman, No. 3,034,302, granted May 15, 1962 and owned by the assignee of the present application. However, since this construction forms no part of the present invention, it is not illustrated nor described further here and for a better understanding thereof, reference may be made to the aforementioned patent.

The piston 123 is adapted to be reciprocated by a novel motion transmission mechanism which interconnects the piston 123 and the motor 25. As seen in FIGS. 6–8, the cam 69, which rotates with the cam shaft 55 and is driven by the motor shaft 31 through the interengaged gears 51, 53, has a peripheral cam groove 129 formed therein which, when fully developed, is preferably, but not necessarily, generally sinusoidal in configuration. An elongated push rod 131 is supported for movement longitudinally thereof and between and parallel to the cam shaft 55 and the cylinder sleeve 119 by spaced steady bearings 130, 132 carried by the bushing 103 and the cylinder 119, respectively. The push rod 131 has a cam follower pin 133 press fitted therein or otherwise secured thereto at one end thereof and which is adapted to be received in the cam groove 129. The other end of the push rod 131 extends rearwardly into the motor housing 13 fixedly carries a connecting or wrist pin 135 which extends guidably through diametrically opposed, longitudinally extending slots 137, 139 formed in the cylinder sleeve 119. The wrist pin 135 also extends through a crosshead 141 which is slidably disposed within the cylinder sleeve 119 and is integral with the piston 123.

Thus, when the cam 69 is rotated, cooperation between the cam groove 129 and the cam follower pin 133 causes the push rod 131 to reciprocate longitudinally and through the wrist pin 135 reciprocates the piston 123. This, in turn, through the air-spring causes the floating ram 117 to reciprocate within the cylinder sleeve 119 and strike the tool bit 110. To prevent the ram 117 from striking and possibly damaging the tubular neck portion 95, the bearing 99 or the bushing 103, a bumper assembly including a tapered, split collet 142 is positioned within a counterbored portion 143 at the forward end of the cylinder sleeve 119 and is spaced from the bushing 103 by an O-ring 145 (see FIGS. 6, 7 and 11).

It will be appreciated that the cam groove 129 and follower pin 133 positively cooperate through all phases of cam rotation. This, in turn, positively reciprocates the piston 123 through both its power and return stroke and therefore provides a more positive and accurate control for movement of the floating ram 117 and better performance of the hammering operation of the tool bit 110.

Furthermore, and perhaps most importantly, the push rod 131 is disposed parallel to the axis of the cam shaft 55, and to the armature shaft 31, and therefore can extend rearwardly into the motor housing 13. The push rod 131 also extends closely parallel to the cylinder sleeve 119 so that the overall axial length of the tool 11 is minimized. This, in turn, makes the tool 11 easier to handle and manipulate, and of course its smaller size makes it lighter and less expensive to manufacture.

By the foregoing, there has been disclosed an improved motion transmission mechanism for impact tools calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. In a power-driven tool of the type having a housing, a drive motor within said housing and having a rotatable shaft, a tool bit supporting member in said housing and adapted to support a tool bit for reciprocating movement along a first longitudinal axis, a reciprocable impact mechanism adapted to strike said tool bit and impart an impact blow thereto, a motion transmission mechanism interconnecting said shaft and said impact mechanism; that improvement wherein said motion transmission mechanism comprises cam means driven by said motor and rotatable about a second axis parallel to said first axis, cam follower means engageable with said cam means and supported for movement along a third longitudinal axis closely disposed parallel to said first and second axes, said cam follower means being interconnected with said impact mechanism whereby to impart an impact blow to said tool bit.

2. A construction as defined in claim 1 wherein said cam means includes a rotatable body having a continuous cam groove formed therein which, when developed, defines a generally sinusoidal curve.

3. A construction as defined in claim 1 wherein said cam follower means includes an elongated rod interconnected adjacent its opposite ends to said cam means and said impact mechanism, respectively.

4. A construction as defined in claim 3 which includes steady bearing means supporting said rod.

5. A construction as defined in claim 3 wherein said impact mechanism is positioned rearwardly, within said housing, relative to said cam means and said tool bit supporting member, said elongated rod extending rearwardly from said cam means to said impact mechanism, whereby to minimize the axial dimension of said tool.

6. A power-driven tool comprising an elongated housing, a drive motor including motor shaft means longitudinally supported within said housing, cam shaft means driven by and extending parallel to said motor shaft means, a tool bit supporting member adapted to support a tool bit for reciprocating movement along an axis parallel to said cam shaft and motor shaft means and disposed to the radial side of said cam shaft means remote from said motor shaft means, a reciprocable impact mechanism generally axially aligned with said tool bit supporting member and spaced axially from said cam shaft means, means interconnecting said cam shaft means and said impact mechanism including an elongated member extending parallel to said cam shaft and motor shaft means and movable longitudinally in response to rotation of said cam shaft means, whereby to reciprocate said impact mechanism and impart an impact blow to said tool bit.

7. A tool as defined in claim 6 wherein said tool bit supporting member includes a spindle shaft supported within said housing for rotation about an axis parallel to said cam shaft and motor shaft means, and means adapted to drivingly interconnect said cam shaft means and said spindle shaft including intermeshing gears.

8. A tool as defined in claim 6 wherein said impact mechanism includes a reciprocal ram having a blind bore formed therein at its rearward end, a piston within said blind bore and having a cross head integral therewith, and means interconnecting said elongated member and said cross head.

9. A tool as defined in claim 6 wherein said cam shaft means includes a rotatable shaft having a cam body rotatable conjointly therewith, said body having a continuous cam groove formed therein which, when fully developed, defines a sinusoidal curve, said elongated member having a cam follower rigid therewith and received in said groove.

10. A tool as defined in claim 6 wherein said cam shaft means and interconnecting means includes a rotatable cam body having a continuous cam groove formed therein and a cam follower disposed within said groove and fixed to said elongated member, respectively.

11. A tool as defined in claim 10 wherein said cam shaft extends forwardly of said motor shaft and said impact mechanism is located rearwardly of said cam body, said cam follower being fixed to said elongated member adjacent one end, said elongated member extending rearwardly into said housing and having its other end interconnected with said impact mechanism.

References Cited

UNITED STATES PATENTS

| 2,051,053 | 8/1936 | Morris | 173—123 X |
| 2,646,100 | 7/1953 | Gibson | 173—123 X |
| 3,161,241 | 12/1964 | Allen et al. | 173—109 X |
| 3,203,490 | 8/1965 | McCarty et al. | 173—109 |
| 3,270,821 | 9/1966 | Bassett et al. | 173—123 |
| 3,334,694 | 8/1967 | Schnettler | 173—109 |

DAVID H. BROWN, Primary Examiner.

U.S. Cl. X.R.

173—109, 117